US010814675B2

(12) United States Patent
Oji

(10) Patent No.: US 10,814,675 B2
(45) Date of Patent: *Oct. 27, 2020

(54) TIRE

(71) Applicant: Sumitomo Rubber Industries, Ltd., Kobe-shi, Hyogo (JP)

(72) Inventor: Takuya Oji, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 532 days.

This patent is subject to a terminal disclaimer.

(21) Appl. No.: 15/631,688

(22) Filed: Jun. 23, 2017

(65) Prior Publication Data

US 2018/0015786 A1 Jan. 18, 2018

(30) Foreign Application Priority Data

Jul. 12, 2016 (JP) .................................. 2016-137933
Mar. 29, 2017 (JP) .................................. 2017-065633

(51) Int. Cl.
*B60C 11/03* (2006.01)
*B60C 11/04* (2006.01)
(Continued)

(52) U.S. Cl.
CPC .......... *B60C 11/03* (2013.01); *B60C 11/0083* (2013.01); *B60C 11/01* (2013.01);
(Continued)

(58) Field of Classification Search
CPC ............. B60C 11/1315; B60C 11/1323; B60C 11/0309; B60C 11/1353; B60C 11/1263;
(Continued)

(56) References Cited

U.S. PATENT DOCUMENTS

| 3,055,410 | A | * | 9/1962 | Caulkins | ............. B60C 11/0309 152/209.21 |
| 5,535,798 | A | * | 7/1996 | Nakamura | .......... B60C 11/0309 152/209.21 |
| 6,488,064 | B1 | * | 12/2002 | Radulescu | .............. B60C 11/01 152/209.14 |
| 2016/0318352 | A1 | * | 11/2016 | Hibino | ................ B60C 11/0327 |

FOREIGN PATENT DOCUMENTS

| EP | 0520755 A1 | 12/1992 | |
| EP | 855292 A1 * | 7/1998 | ............. B60C 11/12 |

(Continued)

OTHER PUBLICATIONS

Machine translation of JP60-193704 (no date).*

(Continued)

*Primary Examiner* — Steven D Maki
*Assistant Examiner* — Philip N Schwartz
(74) *Attorney, Agent, or Firm* — Birch, Stewart, Kolasch & Birch, LLP

(57) ABSTRACT

A tire comprises a tread portion 2 comprising a shoulder main groove 5 extending on a side of a tread edge (Te). The shoulder main groove 5 comprises an inner groove wall 11 having an angle with respect to its tread normal line in a cross section of the shoulder main groove 5 periodically increasing and decreasing in a tire circumferential direction so that the inner groove wall 11 comprises concave wall portions 16 and convex wall portions 17 arranged alternately in the tire circumferential direction. The concave wall portions 16 are provided at inner end portions thereof in a tire axial direction with recess portions 20 locally recessed inwardly in the tire axial direction and having openings at a ground contacting surface of the tread portion 2.

16 Claims, 9 Drawing Sheets

(51) Int. Cl.
*B60C 11/13* (2006.01)
*B60C 11/12* (2006.01)
*B60C 11/00* (2006.01)
*B60C 11/01* (2006.01)

(52) U.S. Cl.
CPC ...... *B60C 11/0306* (2013.01); *B60C 11/0309* (2013.01); *B60C 11/0311* (2013.01); *B60C 11/045* (2013.01); *B60C 11/125* (2013.01); *B60C 11/1263* (2013.01); *B60C 11/1315* (2013.01); *B60C 11/1323* (2013.01); *B60C 2011/0388* (2013.01)

(58) Field of Classification Search
CPC ... B60C 11/125; B60C 11/047; B60C 11/035; B60C 11/0083; B60C 11/01; B60C 11/03; B60C 11/0311; B60C 11/0306; B60C 2011/1361; B60C 2011/0346; B60C 2011/0365; B60C 2011/0369; B60C 2011/0388; B60C 2200/06
See application file for complete search history.

(56) References Cited

FOREIGN PATENT DOCUMENTS

| | | | | |
|---|---|---|---|---|
| EP | 0855292 A1 | | 7/1998 | |
| JP | 60193704 A | * | 10/1985 | ......... B60C 11/0309 |
| JP | 2003063212 A | * | 3/2003 | ........... B60C 11/047 |
| JP | 2008-296795 A | | 12/2008 | |
| JP | 2008296795 A | * | 12/2008 | ........... B60C 11/047 |
| JP | 2014-76764 A | | 5/2014 | |
| JP | 2016-5950 A | | 1/2016 | |

OTHER PUBLICATIONS

Machine translation of JP2008-296795 (no date).*
Machine translation of JP2003-063212 (no date).*
Extended European Search Report issued in European Application No. 17179443.1 dated Nov. 27, 2017.

* cited by examiner

TIRE

TECHNICAL FIELD

The present invention relates to a tire capable of suppressing so-called stone biting in which a stone is caught in a shoulder main groove and remains in the groove.

BACKGROUND ART

In order to suppress stone biting in grooves of tires, Japanese unexamined Patent Application Publication No. 2016-005950, for example, has disclosed a tire configured so that an inner groove wall of the shoulder main groove comprises concave wall portions and convex wall portions arranged alternately in a tire circumferential direction wherein the concave wall portions are concave in a direction away from a groove center of the shoulder main groove and the convex wall portions are convex in a direction approaching the groove center of the shoulder main groove. Although the shoulder main groove configured as such has a certain effect on suppression of the stone biting, there was room for further improvement.

SUMMARY OF THE INVENTION

The present invention was made in view of the above, and a primary object thereof is to provide a tire capable of suppressing the stone biting in a shoulder main groove more certainly by improving an inner groove wall of the shoulder main groove.

In one aspect of the present invention, a tire comprises a tread portion comprising a shoulder main groove extending continuously in a tire circumferential direction on a side of a tread edge, the shoulder main groove comprising an inner groove wall on an inner side in a tire axial direction, the inner groove wall having an angle with respect to a tread normal line of the inner groove wall in a cross section of the shoulder main groove periodically increasing and decreasing in the tire circumferential direction so that the inner groove wall comprises concave wall portions and convex wall portions arranged alternately in the tire circumferential direction, the concave wall portions being concave in a direction away from a groove center of the shoulder main groove, the convex wall portions being convex in a direction approaching the groove center of the shoulder main groove, and the concave wall portions being provided at axially inner end portions thereof with recess portions locally recessed axially inwardly and having openings at a ground contacting surface of the tread portion.

In another aspect of the invention, it is preferred that the recess portions have widths in the tire circumferential direction gradually decreasing axially inwardly at least at the ground contacting surface.

In another aspect of the invention, it is preferred that the recess portions extend from the ground contacting surface to a groove bottom surface of the shoulder main groove.

In another aspect of the invention, it is preferred that the shoulder main groove comprises an outer groove wall on an axially outer side, the outer groove wall has an angle with respect to a tread normal line of the outer groove wall in the cross section of the shoulder main groove periodically increasing and decreasing in the tire circumferential direction so that the outer groove wall comprises convex wall portions and concave wall portions arranged alternately in the tire circumferential direction, the convex wall portions of the outer groove wall face the concave wall portions of the inner groove wall and are convex in a direction approaching the groove center of the shoulder main groove, and the concave wall portions of the outer groove wall face the convex wall portions of the inner groove wall and are concave in a direction away from the groove center of the shoulder main groove.

In another aspect of the invention, it is preferred that each of the inner groove wall and the outer groove wall extends outwardly in a tire radial direction from the groove bottom surface and obliquely in a direction away from the groove center, and in any cross section of the shoulder main groove, the angle of the outer groove wall is larger than the angle of the inner groove wall.

In another aspect of the invention, it is preferred that the tread portion is provided with a middle land region adjacent to the shoulder main groove on the inner side in the tire axial direction, and the middle land region is provided with the recess portions and middle lateral grooves connected with the recess portions and extending across the middle land region.

In another aspect of the invention, it is preferred that the middle lateral grooves comprise main body portions having openings on a side of the ground contacting surface of the middle land region, and sipe portions extending radially inwardly from bottom portions of the main body portions with smaller widths than those of the main body portions.

In another aspect of the invention, it is preferred that sipe walls of the sipe portions on one side in the tire circumferential direction are smoothly connected with groove walls of the main body portions on the one side in the tire circumferential direction.

In another aspect of the invention, it is preferred that each of the recess portions comprises a pair of first groove walls connected with the inner groove wall and a second groove wall extending between the pair of the first groove walls in the tire circumferential direction.

In another aspect of the invention, it is preferred that the shoulder main groove comprises an outer groove wall, in the cross section of the shoulder main groove, each of the inner groove wall and the outer groove wall comprises a main body portion extending radially outwardly from the groove bottom surface and obliquely in a direction away from the groove center of the shoulder main groove, and an outer portion connected with the main body portion on a radially outer side thereof and extending obliquely at an angle with respect to a tread normal line of the outer portion larger than an angle of the main body portion with respect to a tread normal line of the main body portion.

In another aspect of the invention, it is preferred that a maximum depth of the outer portion is 0.30 to 0.50 times a maximum depth of the shoulder main groove.

In another aspect of the invention, it is preferred that the angle of each of the main body portions with respect to the respective tread normal line in the cross section of the shoulder main groove periodically increases and decreases in the tire circumferential direction so that each of the main body portions comprises the concave wall portions and the convex wall portions arranged alternately in the tire circumferential direction.

In another aspect of the invention, it is preferred that each of the convex wall portions of the inner groove wall faces corresponding one of the concave wall portions of the outer groove wall.

In another aspect of the invention, it is preferred that the angle of the main body portion of the outer groove wall with respect to the tread normal line of the main body portion of the outer groove wall is larger than the angle of the main body portion of the inner groove wall with respect to the tread normal line of the main body portion of the inner groove wall.

In another aspect of the invention, it is preferred that difference between the angle of the main body portion of the inner groove wall and the angle of the main body portion of the outer groove wall with respect to the respective tread normal line is in a range of from 2 to 13 degrees.

DESCRIPTION OF THE PREFERRED EMBODIMENT

An embodiment of the present invention will now be described in conjunction with accompanying drawings.

Figure 1:
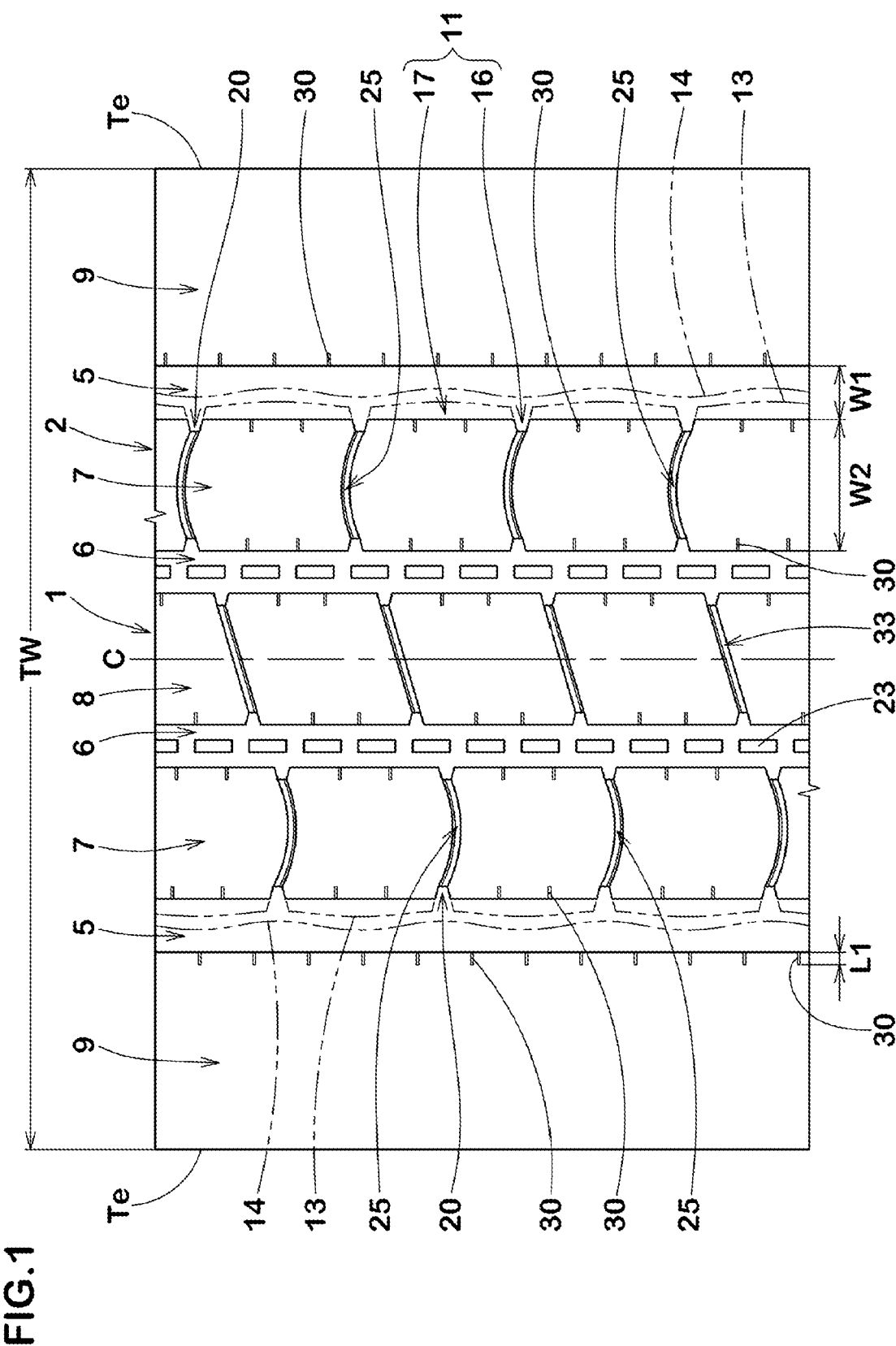
FIG. 1 is a development view of a tread portion of a tire as an embodiment of the present invention.

FIG. 1 is an enlarged view of a tread portion 2 of a tire 1 as an embodiment of the present invention. The tire 1 in this embodiment can be used for various tires such as a pneumatic tire for a passenger car and for heavy duty and a non-pneumatic tire which is not filled with pressurized air, for example. The tire 1 in this embodiment is suitably used, for example, as a pneumatic tire for heavy duty which large ground contact pressure is applied to and therefore the stone biting is likely to occur.

As shown in FIG. 1, the tread portion 2 of the tire 1 is provided with, for example, a pair of shoulder main grooves 5 extending continuously in the tire circumferential direction on sides of tread edges (Te).

The "tread edges (Te)" are defined as axially outermost ground contacting positions when the tire 1 in a standard state is in contact with a flat surface with zero camber angle by being loaded with a standard tire load. The standard state is a state in which the tire 1 is mounted on a standard rim (not shown), inflated to a standard pressure, and loaded with no tire load.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Each of the shoulder main grooves 5 in this embodiment is arranged closest to the tread edges (Te) and extends straight, for example. Shoulder land regions 9 are each defined between the shoulder main groove 5 and its adjacent tread edge (Te). Middle land regions 7 are provided adjacently to the shoulder main grooves 5 on inner sides thereof in the tire axial direction.

In a case of a pneumatic tire for heavy duty, in order to secure sufficient drainage performance, it is preferred that groove widths W1 of the shoulder main grooves 5 are, for example, in a range of from 3.0% to 7.0% of tread width TW. The tread width TW is a distance in the tire axial direction between the tread edges (Te) of the tire 1 in the standard state. From a similar point of view, it is preferred that groove depths of the shoulder main grooves 5 are, for example, in a range of from 10 to 25 mm.

Figure 2:
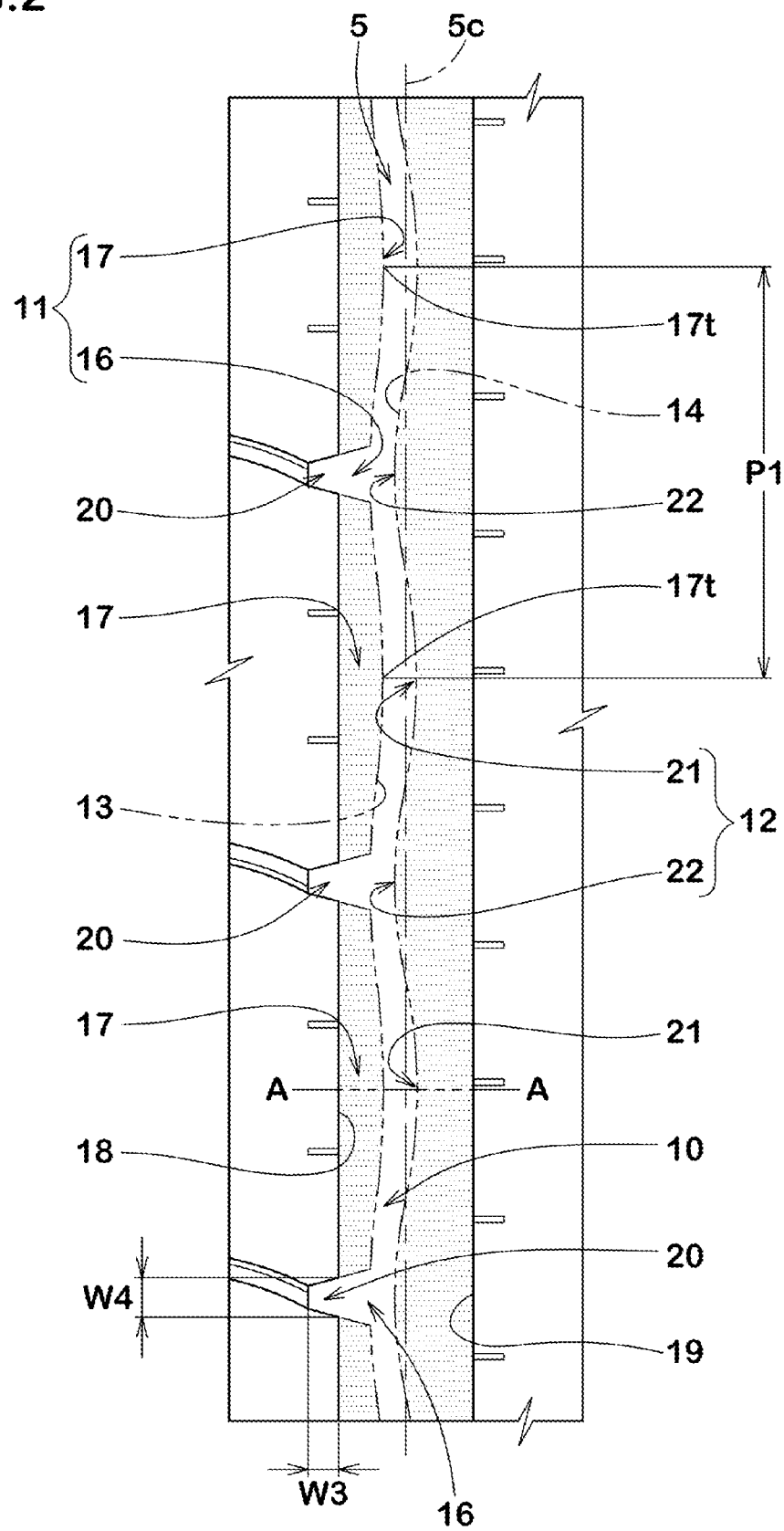
FIG. 2 is an enlarged view of one of shoulder main grooves of FIG. 1.
Figure 3:
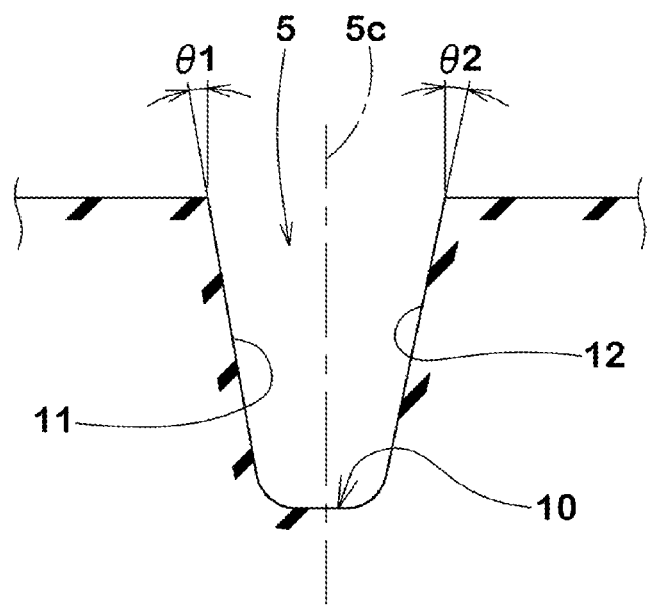
FIG. 3 is an end view taken along A-A line of FIG. 2.

FIG. 2 shows an enlarged view of one of the shoulder main grooves 5 of FIG. 1. FIG. 3 shows an end view taken along A-A line of FIG. 2. As shown in FIGS. 2 and 3, each of the shoulder main grooves 5 has an inner groove wall 11 and an outer groove wall 12.

The inner groove wall 11 is formed on an inner side in the tire axial direction of a groove center 5c. The inner groove wall 11 is formed between a groove edge 18 on the inner side in the tire axial direction and a groove bottom surface 10. The outer groove wall 12 is formed on an outer side in the tire axial direction of the groove center 5c. The outer groove wall 12 is formed between a groove edge 19 on the outer side in the tire axial direction and the groove bottom surface 10. The groove center 5c in this specification means an virtual plane extending in a depth direction of the groove through a center position between a pair of the groove edges 18 and 19 in plan view of the tread portion. The inner groove wall 11 and the outer groove wall 12 are each inclined to a direction away from the groove center 5c from the groove bottom surface 10 toward the outside in the tire radial direction in a cross section of the groove. Note that the cross section of the groove is a cross section perpendicular to a longitudinal direction of the shoulder main groove.

For ease of understanding of the invention, in FIG. 2, the inner groove wall 11 and the outer groove wall 12 are hatched. Further, in FIGS. 1 and 2, an inner groove bottom edge 13 where the groove bottom surface 10 intersects with the inner groove wall 11 of the shoulder main groove 5 and an outer groove bottom edge 14 where the groove bottom surface 10 of the shoulder main groove 5 intersects with the outer groove wall 12 are indicated by a two-dot chain line.

As shown in FIGS. 2 and 3, an angle $\theta 1$ of the inner groove wall 11 with respect to a tread normal line of the inner groove wall 11 in the cross section of the groove periodically increases and decreases in the tire circumferential direction. Thereby, the inner groove wall 11 includes concave wall portions 16 concave in a direction away from the groove center of the shoulder main groove 5 and convex wall portions 17 convex in a direction approaching the groove center of the shoulder main groove 5 arranged alternately in the tire circumferential direction. Each of the concave wall portions 16 and the convex wall portions 17 in this embodiment has a smoothly curved outer surface. The concave wall portions 16 and the convex wall portions 17 change shapes inside the main grooves greatly before and after the main grooves contact with ground, therefore, they help to drain stones caught in the grooves.

Each of the inner groove walls 11 in this embodiment is formed between the groove edge 18 extending straight in the tire circumferential direction on a side of ground contacting surface and the inner groove bottom edge 13 extending in a wavy shape in the tire circumferential direction. The straight groove edge 18 helps to suppress uneven wear thereof. It can be expected that the inner groove bottom edge 13 extending in a wavy shape discharges stones that have entered a vicinity of the groove bottom surfaces 10.

It is preferred that the inner groove bottom edges 13 extend, for example, in sine-wave shapes. The inner groove bottom edges 13 configured as such can smoothly deform as a whole when stress is applied to the tread portion 2, and thus disperse the stress applied to the groove bottom surfaces, therefore, it is possible that tearing damage (hereafter, may be referred to as "rib tear") of the shoulder land regions 9 is suppressed.

It is preferred that a minimum value of the angles $\theta 1$ of the inner groove walls 11 is, for example, in a range of from 5 to 8 degrees. It is preferred that a maximum value of the angles $\theta 1$ is, for example, in a range of from 9 to 12 degrees. It is preferred that the angles $\theta 1$ of the inner groove walls 11 periodically varies in the tire circumferential direction within a range of from 7 to 10 degrees, for example. The inner groove walls 11 configured as such help to suppress the stone biting while maintaining the drainage performance.

From a similar point of view, it is preferred that pitches P1 in the tire circumferential direction of the concave wall portions 16 or the convex wall portions 17 are, for example, in a range of from 0.10 to 0.20 times the tread width TW (shown in FIG. 1). Note that each of the pitches P1 is indicated, for example, by a distance between a pair of axially outer peaks 17t of the convex wall portions 17 adjacent in the tire circumferential direction.

The concave wall portions 16 are provided at axially inner peaks thereof with recess portions 20 locally recessed inwardly in the tire axial direction and having openings at the ground contacting surface of the tread portion 2. The recess portions 20 configured as such provide large spaces locally on sides of the concave wall portions 16, therefore, it is possible that stones in the shoulder main grooves 5 are certainly discharged. Further, the main grooves are resiliently deformed so as to narrow and then widen groove spaces thereof starting from the recess portions 20 at the time of contacting with the ground and then separating from the ground, therefore, it is possible that stones caught in the shoulder main grooves 5 are discharged.

Figure 4:
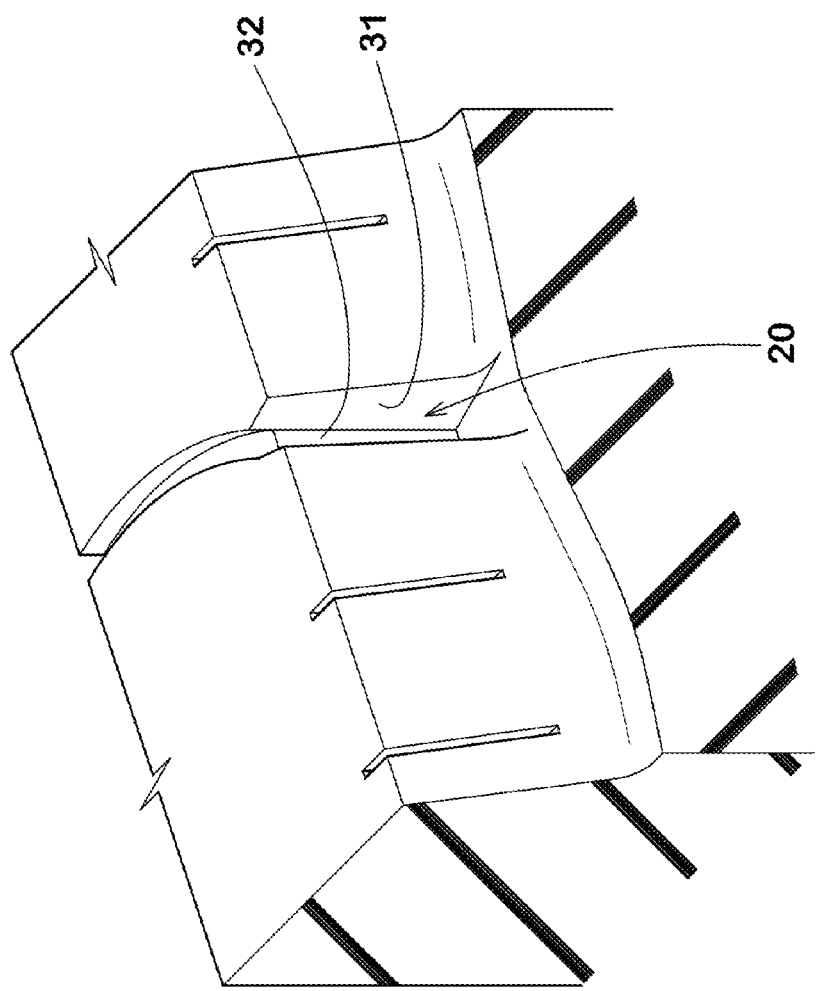
FIG. 4 is a perspective view of an recess portion of FIG. 2.

In FIG. 4, a perspective view of one of the recess portions 20 is shown. As shown in FIG. 4, in order to further exert the above-mentioned effect, it is preferred that the recess portions 20 extend from the ground contacting surface to the groove bottom surfaces. It can be expected that the recess portions 20 configured as such discharge stones that have entered the vicinity of the groove bottom surfaces 10.

Each of the recess portions 20 includes a pair of first groove walls 31 connected with the inner groove wall 11 and a second groove wall 32 between the pair of the first groove walls 31. For example, the pair of the first groove walls 31 extends obliquely from the inner groove wall 11 in the tire axial direction. The second groove wall 32 extends between the pair of the first groove walls 31 in the tire circumferential direction. The recess portions 20 configured as such are helpful in suppressing excessive decrease in rigidity of the middle land regions 7.

As shown in FIG. 2, it is preferred that widths of the recess portions 20 in the tire circumferential direction gradually decrease axially inwardly at least on the ground contacting surface. The widths in the tire circumferential direction of the recess portions 20 in this embodiment gradually decrease axially inwardly over the entire region from the ground contacting surface to the groove bottom surface. The recess portions 20 configured as such can open and close more largely during running, and further, it is possible that the stones are more likely to be discharged.

It is preferred that widths W3 in the tire axial direction of the recess portions 20 are, for example, 0.05 to 0.12 times widths W2 (shown in FIG. 1 and the same applies hereinafter) in the tire axial direction of the middle land regions 7. It is preferred that widths W4 in the tire circumferential direction of the recess portions 20 are, for example, 0.08 to 0.15 times the widths W2 of the middle land regions 7. The recess portions 20 configured as such can obtain the above-mentioned effect while maintaining the rigidity of the middle land regions 7.

Similarly to the inner groove wall 11, an angle $\theta 2$ of the outer groove wall 12 with respect to the tread normal line in the cross section of the groove also periodically increases and decreases in the tire circumferential direction. Thereby, the outer groove wall 12 includes convex wall portions 22 convex in the direction approaching the groove center of the shoulder main groove 5, and concave wall portions 21 concave in the direction away from the groove center of the shoulder main groove 5 arranged alternately in the tire circumferential direction. Each of the concave wall portions 21 and the convex wall portions 22 of the outer groove wall 12 also has a smoothly curved outer surface.

Each of the convex wall portions 22 of the outer groove wall 12 in this embodiment faces corresponding one of the concave wall portions 16 of the inner groove wall 11. Each of the concave wall portions 21 of the outer groove wall 12 in this embodiment faces corresponding one of the convex wall portions 17 of the inner groove wall 11. The outer groove wall 12 configured as such together with the inner groove wall 11 are helpful in suppressing the stone biting.

The outer groove wall 12 in this embodiment is formed between the groove edge 19 extending straight along the tire circumferential direction and the outer groove bottom edge 14 extending in a wavy shape in the tire circumferential direction.

It is preferred that the outer groove bottom edges 14 extend in the tire circumferential direction with a same phase as the inner groove bottom edges 13, for example. As a further preferred embodiment, the outer groove bottom edges 14 in this embodiment extend in sine-wave shapes in the tire circumferential direction at amplitudes greater than those of the inner groove bottom edges 13. The outer groove bottom edges 14 configured as such further promote the discharge of stones and disperse the stress applied to the groove bottom surfaces 10, therefore, it is possible that the rib tear is suppressed effectively.

It is preferred that the angles $\theta 2$ of the outer groove walls 12 are larger than the angles $\theta 1$ of the inner groove walls 11. As a further preferred embodiment, the angles $\theta 2$ of the outer groove walls 12 in this embodiment are larger than the angles $\theta 1$ of the inner groove wall 11 in any cross section of the shoulder main grooves 5. Thereby, the rib tear is suppressed more certainly.

It is preferred that a minimum value of the angles $\theta 2$ of the outer groove walls 12 is, for example, in a range of from 10 to 14 degrees. It is preferred that a maximum value of the angles $\theta 2$ is, for example, in a range of from 18 to 22 degrees. It is preferred that the angles $\theta 2$ of the outer groove walls 12 periodically varies in a tire circumferential direction within a range of from 12 to 20 degrees, for example. The outer groove walls 12 configured as such can suppress the stone biting and the rib tear without impairing wet performance.

It is preferred that difference between the angles $\theta 2$ of the outer groove walls 12 and the angles $\theta 1$ of the inner groove walls 11 is, for example, in a range of from 2 to 13 degrees. The outer groove walls 12 and the inner groove walls 11 configured as such are helpful for uniform wear of each of the groove edges 18 and 19.

As shown in FIG. 1, the tread portion 2 is further provided with crown main grooves 6. The crown main grooves 6 are provided on the inner side in the tire axial direction of the shoulder main grooves 5. The crown main grooves 6 in this embodiment are provided on each side of a tire equator C, for example. Alternatively, one crown main groove 6 may be provided on the tire equator C. The crown main grooves 6 have, for example, same groove widths and groove depths as those of the shoulder main grooves 5 described above.

It is preferred that the crown main grooves 6 are, for example, provided with a plurality of protrusions 23 protruding from groove bottom surfaces of the crown main grooves 6 and arranged in the tire circumferential direction.

The protrusions 23 configured as such can effectively suppress the stone biting of the crown main grooves 6. Further, in this embodiment, by not providing the protrusions in the shoulder main grooves 5, groove capacity of the shoulder main grooves 5 is secured, therefore, the wet performance is improved, while by providing the protrusions 23 in the crown main grooves 6, the stone biting is certainly suppressed in the crown main grooves 6 to which large ground contact pressure is applied.

The shoulder main grooves 5 and the crown main grooves 6 in this embodiment are provided with a plurality of lug sipes 30 one ends of which are connected to the main grooves and the other ends of which terminate within the land regions. Lengths L1 in the tire axial direction of the lug sipes 30 are, for example, in a range of from 0.5% to 5.0% of the tread width TW. The lug sipes 30 configured as such suppress distortion of the groove edges of each of the main grooves at time of ground contacting and therefore help to suppress the uneven wear thereof.

The tread portion 2 is provided with the shoulder main grooves 5 and the crown main grooves 6, therefore, a crown land region 8 is defined in the tread portion 2 in addition to the shoulder land regions 9 and the middle land regions 7. The crown land region 8 is defined between the pair of the crown main grooves 6, for example.

Figure 5:
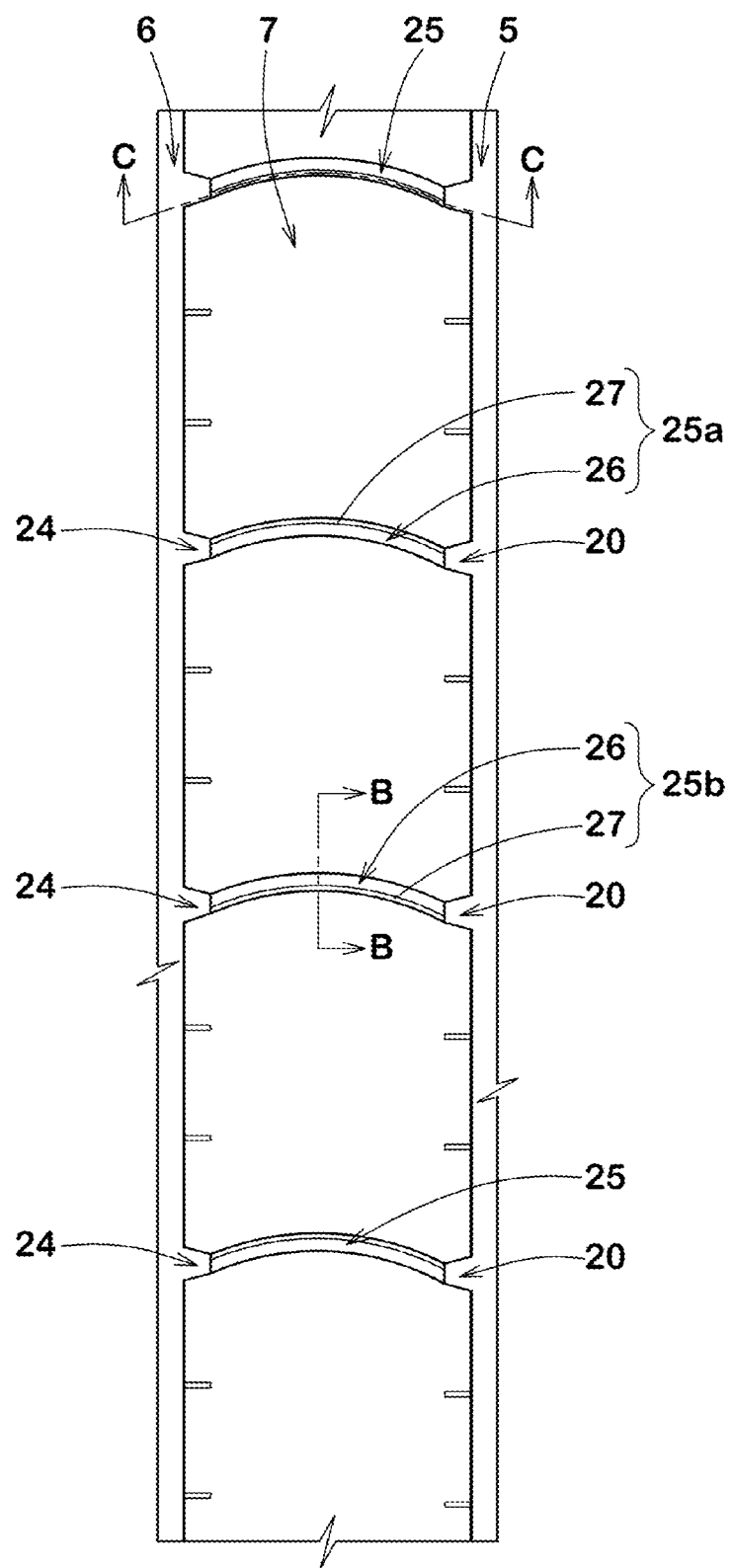
FIG. 5 is an enlarged view of one of middle land regions of FIG. 1.

An enlarged view of one of the middle land regions 7 is shown in FIG. 5. As shown in FIG. 5, the middle land region 7 is defined between the crown main groove 6 and the shoulder main groove 5. The middle land region 7, for example, is provided with the above-described recess portions 20 and a plurality of middle lateral grooves 25 connected to the recess portions 20 and extending between the shoulder main groove 5 and the crown main groove 6. The middle lateral grooves 25 in this embodiment are provided at end portions thereof on a side of the crown main grooves 6 with recess portions 24 similar to the recess portions 20. Thereby, it is possible that the stone biting in the crown main grooves 6 is further suppressed.

In a plan view of the tread portion 2, it is preferred that each of the middle lateral grooves 25 is curved in an arc shape. The middle lateral grooves 25 configured as such disperse stress applied to groove edges thereof and therefore help to suppress the uneven wear of the land region starting from the groove edges.

As shown in FIG. 1, it is preferred that the middle lateral grooves 25 provided in the middle land region 7 on one side of the tire equator C and the middle lateral grooves 25 provided in the middle land region 7 on the other side of the tire equator C in this embodiment are convex in directions opposite to each other. According to such an arrangement of the middle lateral grooves 25, edge effect is exerted regardless of a direction of rotation of the tire.

Figure 6A:
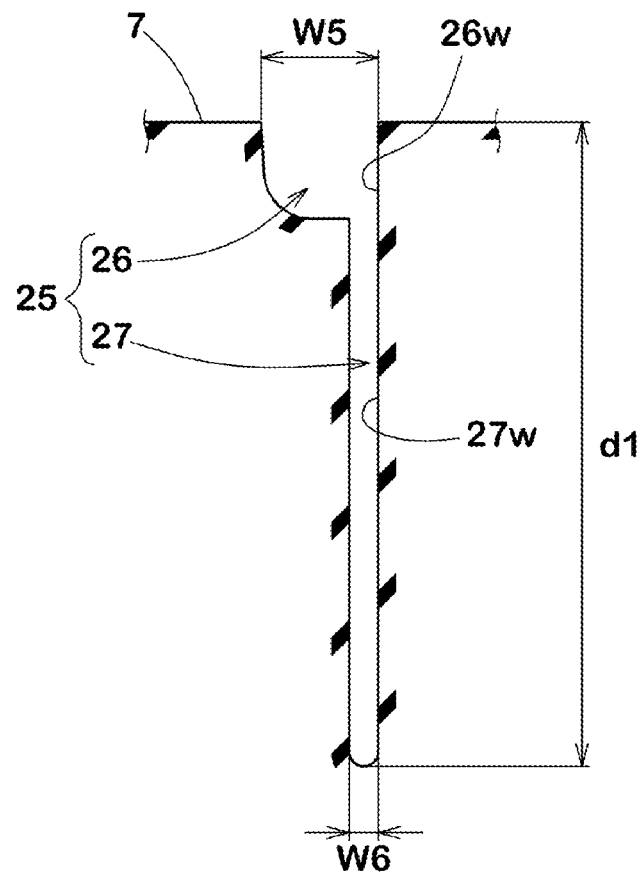
FIG. 6A is a cross-sectional view taken along B-B line of FIG. 5.

A cross-sectional view taken along line B-B of FIG. 4 is shown in FIG. 6A. As shown in FIG. 6A, each of the middle lateral grooves 25 includes a main body portion 26 and a sipe portion 27. The main body portion 26 has an opening on a side of the ground contacting surface of the land region and has a groove width W5 not less than 2.0 mm. The sipe portion 27 extends radially inwardly from a bottom portion of the main body portion 26 with a width W6 smaller than that of the main body portion 26. The width W6 of the sipe portion 27 is, for example, in a range of from 0.5 to 1.5 mm. A depth d1 from the ground contacting surface to a bottom of the sipe portion is, for example, in a range of from 0.50 to 0.60 times the depth of the shoulder main grooves 5.

A sipe wall 27w on one side in the tire circumferential direction of the sipe portion 27 in this embodiment is connected smoothly with a groove wall 26w on the one side in the tire circumferential direction of the main body portion 26, for example.

As shown in FIG. 5, the middle lateral grooves 25 in this embodiment include middle lateral grooves 25a and middle lateral grooves 25b arranged alternately in the tire circumferential direction. In each of the middle lateral grooves 25a, the sipe wall on one side (upper side in FIG. 5) in the tire circumferential direction of the sipe portion 27 and the groove wall on the one side in the tire circumferential direction of the main body portion 26 are connected. In each of the second middle lateral grooves 25b, the sipe wall on the other side (lower side in FIG. 5) in the tire circumferential direction of the sipe portion 27 and the groove wall on the other side in the tire circumferential direction of the main body portion 26 are connected. Thereby, rigidity of each block between the middle lateral grooves 25 is slightly different, therefore, it is possible that impact sound generated when the middle land regions 7 contact with the ground is changed to white noise.

Figure 6B:
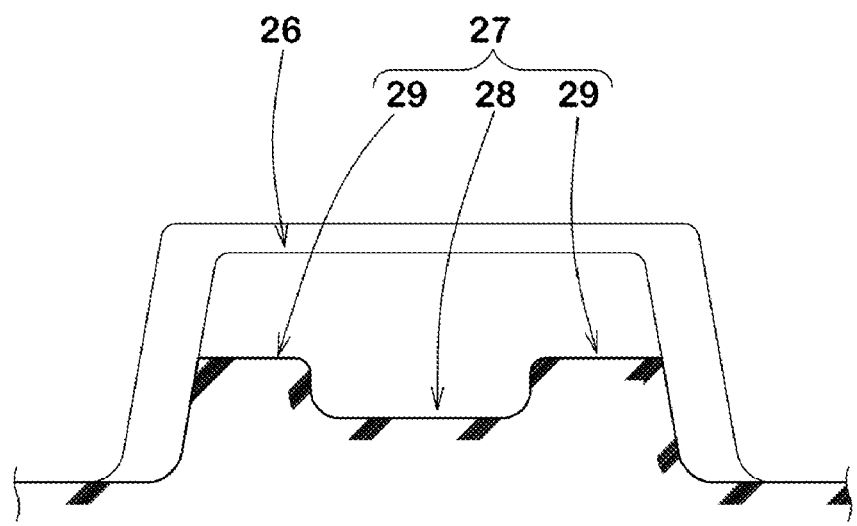
FIG. 6B is a cross-sectional view taken along C-C line of FIG. 5.

A cross-sectional view of the middle lateral groove 25 taken along line C-C in FIG. 5 is shown in FIG. 6B. As shown in FIG. 6B, each of the sipe portions 27 includes a center portion 28 and end portions 29 having different depths from that of the center portion 28. The end portions 29 in this embodiment are disposed on both sides of the center portion 28 and have smaller depths than the center portion 28. Thereby, the sipe portion 27 is suppressed from opening too much, therefore, steering stability is improved.

Figure 7:
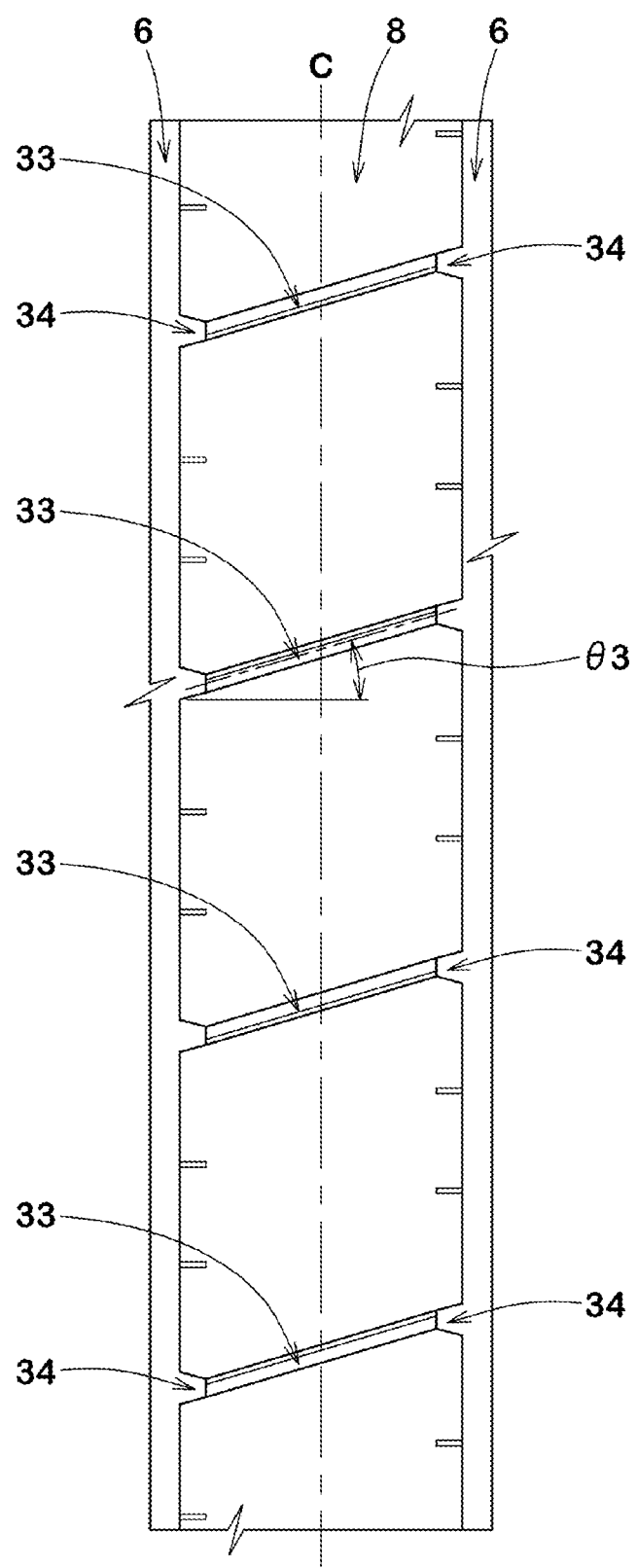
FIG. 7 is an enlarged view of a crown land region of FIG. 1.

An enlarged view of the crown land region 8 of FIG. 1 is shown in FIG. 7. As shown in FIG. 7, the crown land region 8 is provided with a plurality of crown lateral grooves 33. Each of the crown lateral grooves 33 extends between the crown main grooves 6, for example. The crown lateral grooves 33 extend straight and obliquely at angles θ3 in a range of from 10 to 40 degrees with respect to the tire axial direction, for example.

Both end portions of each of the crown lateral grooves 33 are connected with recess portions 34 similar to those described above, for example. Thereby, the stone biting of the crown main grooves 6 is further suppressed.

As a preferred embodiment, the crown lateral grooves 33 in this embodiment have substantially same cross sectional shapes as the middle lateral grooves 25 shown in FIGS. 6A and 6B, for example. That is, the crown lateral grooves 33 include, for example, main body portions having groove widths not less than 2.0 mm and sipe portions extending radially inwardly from bottom portions of the main body portions (not shown).

As shown in FIG. 1, it is preferred that the crown lateral grooves 33 and the middle lateral grooves 25 are misaligned to each other in the tire circumferential direction. The crown lateral grooves 33 and the middle lateral grooves 25 configured as such do not contact with the ground at the same time, therefore, they are helpful in suppressing maximum sound pressure of pumping sound.

As a further preferred embodiment, each of the crown lateral grooves 33 in this embodiment is disposed in a position so as to be smoothly connected via the crown main grooves 6 with the middle lateral grooves 25 disposed on both sides. Thereby, during running on a wet road, water in the crown lateral grooves 33 is likely to be discharged to the outer side in the tire axial direction.

The shoulder land regions 9 are semi-plain ribs not provided with grooves and sipes except for the above-described lug sipes 30. The shoulder land regions 9 configured as such can provide excellent steering stability.

Figure 8:
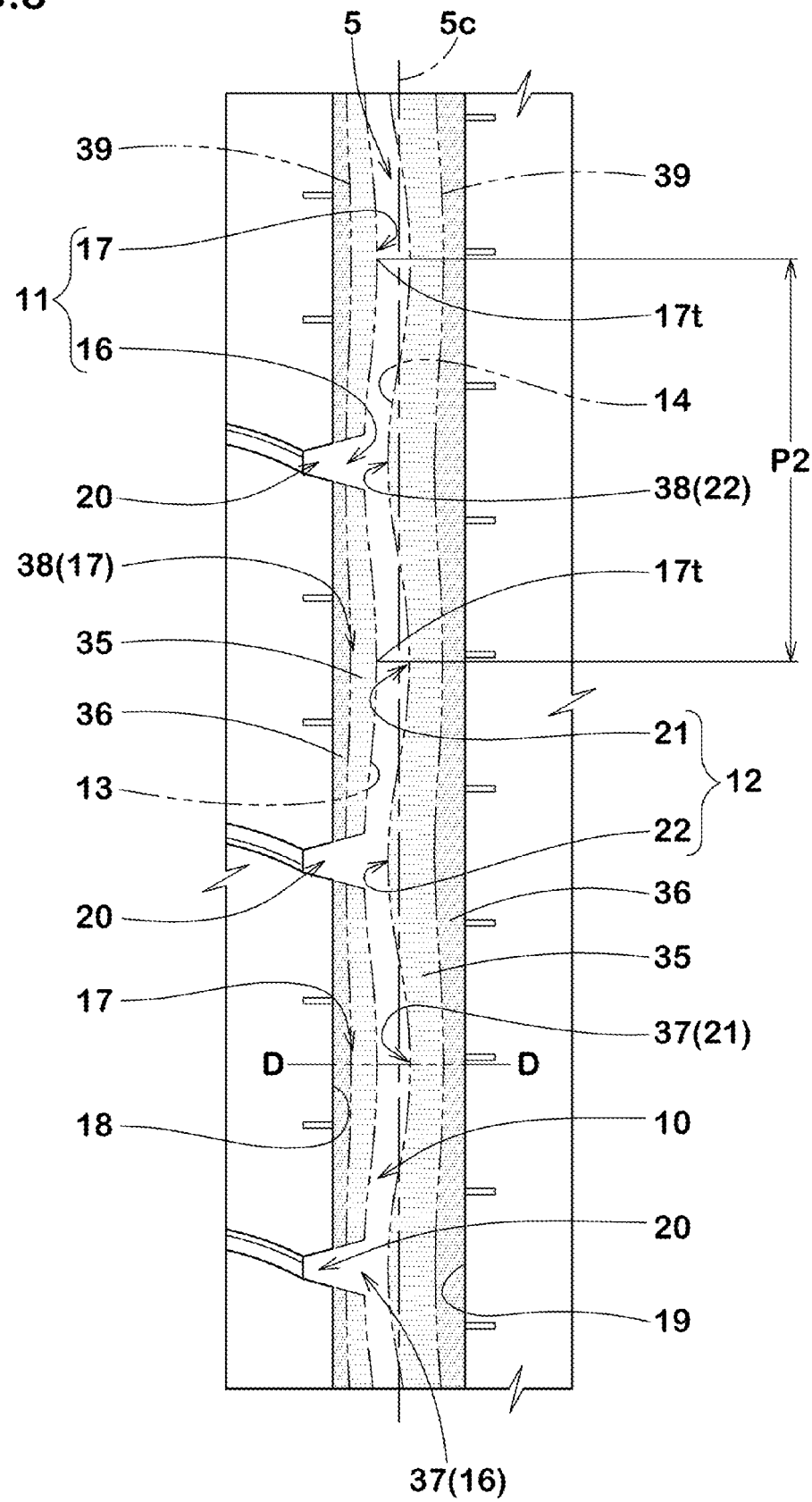
FIG. 8 is an enlarged view of the shoulder main groove as another embodiment of the present invention.
Figure 9:
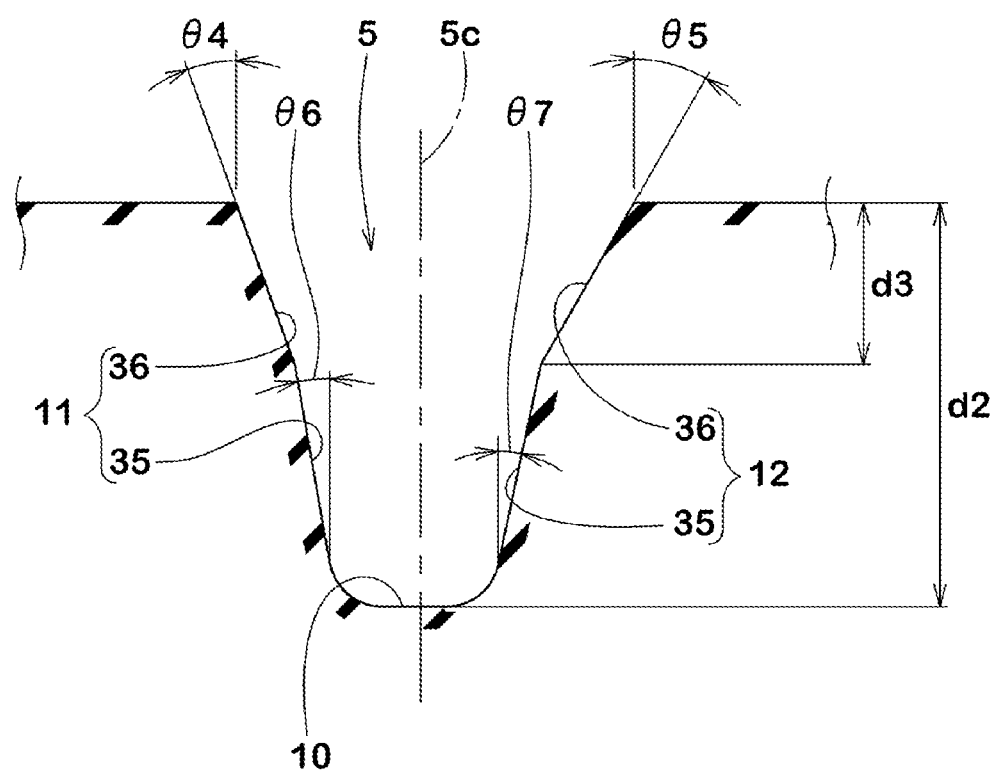
FIG. 9 is an end view taken along D-D line of FIG. 8.

In FIG. 8, an enlarged view of the shoulder main grooves 5 in another embodiment of the present invention is illustrated. In FIG. 9, an end view of the shoulder main grooves 5 taken along line D-D in FIG. 8 is illustrated. In FIGS. 8 and 9, the same reference numbers are given to elements common to the above-described embodiment, and the explanation thereof is omitted.

As shown in FIGS. 8 and 9, in the cross section of the shoulder main grooves 5, each of the inner groove walls 11 and the outer groove walls 12 in this embodiment has a main body portion 35 and an outer portion 36. The main body portion 35 extends radially outwardly from the groove bottom surface 10 and obliquely in a direction away from the groove center 5c of the shoulder main grooves 5. The outer portion 36 is connected with the main body portion 35 on the outer side thereof in the tire radial direction. The outer portion 36 is inclined at an angle with respect to a tread normal line of the outer portion 36 larger than an angle of the main body portion with respect to the tread normal line of the main body portion. The shoulder main grooves 5 configured as such can easily discharge stones caught in the grooves. Note that in FIG. 8, in order to make the invention easy to understand, the main body portions 35 and the outer portions 36 are hatched, and boundaries 39 between the main body portions 35 and the outer portions 36 are indicated by two-dot chain lines.

As shown in FIG. 9, it is preferred that maximum depths d3 of the outer portions 36 are, for example, in a range of 0.30 to 0.50 times maximum depths d2 of the shoulder main grooves 5. The outer portions 36 configured as such can exert the above-described effect while securing the wet performance.

It is preferred the outer portions 36 of the inner groove walls 11 are inclined, for example, at angles θ4 in a range of from 15 to 25 degrees with respect to tread normal lines of the outer portions 36 of the inner groove walls 11. The inner groove walls 11 configured as such can suppress the stone biting while maintaining anti-wear performance by securing the width of the middle land regions 7.

From a similar point of view, it is preferred that the outer portions 36 of the outer groove walls 12 are inclined, for example, at angles θ5 with respect to tread normal lines of the outer portions 36 of the outer groove walls 12 larger than the angles θ4 of the outer portions 36 of the inner groove walls 11 with respect to the tread normal lines of the outer portions 36 of the inner groove walls 11. Specifically, it is preferred that the angles θ5 of the outer portions 36 of the outer groove walls 12 are, for example, in a range of from 25 to 35 degrees.

As shown in FIG. 8, each of the main body portions 35 has the angle increasing and decreasing repeatedly and periodically in the tire circumferential direction with respect to the tread normal line in the cross section of the groove. Thereby, each of the main body portions 35 includes concave wall portions 37 and convex wall portions 38 arranged alternately in the tire circumferential direction, wherein the concave wall portions 37 are concave in the direction away from the groove center of the shoulder main groove 5 and the convex wall portions 38 are convex in the direction approaching the groove center of the shoulder main groove 5. Each of the convex wall portions 17 of the inner groove walls 11 in this embodiment faces corresponding one of the concave wall portions 21 of the outer groove walls 12. Each of the convex wall portions 22 of the outer groove walls 12 in this embodiment faces corresponding one of the concave wall portion 16 of the inner groove walls 11.

Pitches P2 in the tire circumferential direction of the concave wall portions 16 and 21 or the convex wall portions 17 and 22 (the pitch between the outer peaks 17t of the convex wall portions 17 of the inner groove wall 11 is shown in FIG. 8) are preferably in a range of from 0.10 to 0.20 times the tread width TW, more preferably in a range of from 0.15 to 0.18 times the tread width TW. The main body portions 35 configured as such are useful for suppressing the stone biting while maintaining the drainage performance.

As shown in FIG. 9, it is preferred that angles θ6 of the main body portions 35 of the inner groove walls 11 with respect to the tread normal lines of the main body portions 35 of the inner groove walls 11 change, for example, in a range of from 7 to 10 degrees periodically in the tire circumferential direction.

It is preferred that angles θ7 of the main body portions 35 of the outer groove walls 12 with respect to the tread normal lines of the main body portions 35 of the outer groove walls 12 change, for example, in a range of from 12 to 20 degrees periodically in the tire circumferential direction.

It is preferred that the angles θ7 of the main body portions 35 of the outer groove walls 12 are, for example, larger than the angles θ6 of the main body portions 35 of the inner groove walls 11. As a further preferred embodiment, the angles θ7 of the main body portions 35 of the outer groove walls 12 in this embodiment are larger than the angles θ6 of the main body portions 35 of the inner groove walls 11 in any cross section of the shoulder main grooves 5. It is preferred that difference between the angles of the main body portions 35 of the inner groove walls 11 with respect to the tread normal lines of the main body portions 35 of the inner groove walls 11 and the angles of the main body portions 35 of the outer groove walls 12 with respect to the tread normal lines of the main body portions 35 of the outer groove walls 12 is, for example, in a range of from 2 to 13 degrees. Thereby, for example, even if the stone biting occurs in the shoulder main grooves 5, the shoulder land regions 9 deform moderately, therefore, it is possible that the stones are discharged quickly.

While detailed description has been made of the tire as an embodiment of the present invention, the present invention can be embodied in various forms without being limited to the illustrated embodiment.

Working Example (Example)

Pneumatic tires for heavy duty of size 295/75R22.5 having the basic tread pattern shown in FIG. 1 and the inner groove walls and the outer groove walls of the shoulder main groove shown in FIGS. 2 and 3 were made by way of test according to the specification listed in Table 1. As a reference, a tire having the basic tread pattern was made by way of test in which the angles of the inner groove walls and the outer groove walls were constant through an entire circumference of the tire. Each of the test tires was tested for stone biting performance and the wet performance. Common specifications, test methods, etc. of the test tires are as follows.

Rim: 22.5×8.25

Tire pressure: 830 kPa

Test car: 10-ton truck loaded 50% of standard load capacity at center of loading platform Tire mounting position: all wheels <Stone Biting Performance>

After the above test car was driven on a general road for 16000 km, weight of stones caught in the shoulder main grooves of each of the test tires was measured. The results are indicated by an index based on the reference being 100, wherein the smaller the numeric value, the more occurrence of the stone biting is suppressed.

<Wet Performance>

The test car was driven on an asphalt road surface with a puddle with depth of 3 mm at a speed accelerated from 50 km/h, and the speed when a hydroplaning phenomenon occurred was measured. The results are indicated by an index based on the reference being 100, wherein the larger the numeric value, the better the wet performance is.

The test results are shown in Table 1.

TABLE 1

|  | Ref. | Ex. 1 | Ex. 2 | Ex. 3 | Ex. 4 | Ex. 5 | Ex. 6 | Ex. 7 |
|---|---|---|---|---|---|---|---|---|
| Minimum value of Angles $\theta 1$ of Inner groove walls [degree] | 7 | 7 | 7 | 1 | 5 | 8 | 7 | 7 |
| Maximum value of Angles $\theta 1$ of Inner groove walls [degree] | 7 | 10 | 10 | 5 | 9 | 12 | 10 | 10 |
| Minimum value of Angles $\theta 2$ of Outer groove walls [degree] | 12 | 12 | 12 | 16 | 12 | 12 | 10 | 14 |
| Maximum value of Angles $\theta 2$ of Outer groove walls [degree] | 12 | 20 | 16 | 19 | 20 | 20 | 18 | 22 |
| Range of difference between Angles $\theta 2$ and Angles $\theta 1$ [degree] | 5 | 2-13 | 2-9 | 11-18 | 3-15 | 0-12 | 0-11 | 4-15 |
| Stone biting performance [index] | 100 | 84 | 89 | 93 | 88 | 85 | 86 | 84 |
| Wet performance [index] | 100 | 103 | 103 | 104 | 103 | 101 | 103 | 101 |

From the test results, it was confirmed that the tires as the examples suppressed the stone biting effectively. Further, it was confirmed that the tires as the examples maintained the wet performance.

Pneumatic tires for heavy duty of size 295/80R22.5 having the basic tread pattern shown in FIG. 1 and the inner groove walls and the outer groove walls of the shoulder main grooves shown in FIGS. 8 and 9 were made by way of test according to the specifications listed in Table 2. Each of the test tires was tested for the stone biting performance and the wet performance described above and uneven wear resistance performance described below.

<Uneven Wear Resistance Performance>

Difference in wear amount between both groove edges of the shoulder main grooves was measured after the test car was driven for 48000 km. The results are indicated by an index based on the reference being 100, wherein the smaller the numerical value, the better the uneven wear resistance performance is.

The test results are shown in Table 2.

TABLE 2

|  | Ref. | Ex. 8 | Ex. 9 | Ex. 10 | Ex. 11 | Ex. 12 | Ex. 13 |
|---|---|---|---|---|---|---|---|
| Depths d3 of Outer portions/Depths d2 of Shoulder main grooves | — | 0.4 | 0.2 | 0.3 | 0.5 | 0.6 | 0.4 |
| Range of Angles $\theta 6$ of Main body portions of Inner groove walls [degree] | 7 | 7-10 | 7-10 | 7-10 | 7-10 | 7-10 | 7-10 |
| Range of Angles $\theta 7$ of Main body portions of Inner groove walls [degree] | 12 | 12-20 | 12-20 | 12-20 | 12-20 | 12-20 | 12-20 |
| Range of difference between Angles $\theta 2$ and Angles $\theta 1$ [degree] | 5 | 2-13 | 2-13 | 2-13 | 2-13 | 2-13 | 2-13 |
| Angles $\theta 4$ of Outer portions of Inner groove walls [degree] | — | 20 | 20 | 30 | 20 | 20 | 15 |
| Angles $\theta 5$ of Outer portions of Outer groove walls [degree] | — | 30 | 30 | 20 | 30 | 30 | 25 |
| Stone biting performance [index] | 100 | 80 | 85 | 81 | 78 | 78 | 83 |
| Wet performance [index] | 100 | 104 | 102 | 103 | 103 | 104 | 102 |
| Uneven wear resistance performance [index] | 100 | 97 | 94 | 97 | 99 | 102 | 96 |

|  | Ex. 14 | Ex. 15 | Ex. 16 | Ex. 17 | Ex. 18 | Ex. 19 | Ex. 20 |
|---|---|---|---|---|---|---|---|
| Depths d3 of Outer portions/Depths d2 of Shoulder main grooves | 0.4 | 0.4 | 0.4 | 0.4 | 0.4 | 0.4 | 0.4 |
| Range of Angles $\theta 6$ of Main body portions of Inner groove walls [degree] | 7-10 | 7-10 | 7-10 | 7-10 | 1-5 | 5-12 | 7-9 |
| Range of Angles $\theta 7$ of Main body portions of Inner groove walls [degree] | 12-20 | 12-20 | 12-20 | 6-9 | 16-19 | 10-22 | 14-18 |
| Range of difference between Angles $\theta 2$ and Angles $\theta 1$ [degree] | 2-13 | 2-13 | 2-13 | 2-4 | 14-15 | 0-17 | 5-11 |

TABLE 2-continued

| | | | | | | | |
|---|---|---|---|---|---|---|---|
| Angles θ4 of Outer portions of Inner groove walls [degree] | 25 | 30 | 35 | 20 | 20 | 20 | 20 |
| Angles θ5 of Outer portions of Outer groove walls [degree] | 35 | 40 | 45 | 30 | 30 | 30 | 30 |
| Stone biting performance [index] | 79 | 78 | 78 | 86 | 83 | 78 | 82 |
| Wet performance [index] | 104 | 105 | 106 | 104 | 103 | 104 | 103 |
| Uneven wear resistance performance [index] | 98 | 100 | 102 | 95 | 97 | 100 | 95 |

From the test results, it was confirmed that the tires as the examples suppressed the stone biting effectively. Further, it was confirmed that the tires as the examples maintained the wet performance and the uneven wear resistance performance.

The invention claimed is:

1. A tire comprising:
a tread portion comprising a shoulder main groove extending continuously in a tire circumferential direction on a side of a tread edge;
the shoulder main groove comprising an inner groove wall on an inner side in a tire axial direction and an outer inner groove wall on an outer side in the tire axial direction, wherein
the inner groove wall is formed between an inner groove edge extending straight in the tire circumferential direction on a side of ground contacting surface and an inner groove bottom edge extending in a sine-wave shape in the tire circumferential direction,
the outer groove wall is formed between an outer groove edge extending straight in the tire circumferential direction on the side of ground contacting surface and an outer groove bottom edge extending in a sine-wave shape in the tire circumferential direction; and
the outer groove bottom edge has an amplitude greater than that of the inner groove bottom edge;
the inner groove wall having an angle with respect to a tread normal line of the inner groove wall in a cross section of the shoulder main groove periodically increasing and decreasing in the tire circumferential direction so that the inner groove wall comprises concave wall portions and convex wall portions arranged alternately in the tire circumferential direction;
the concave wall portions being concave in a direction away from a groove center of the shoulder main groove;
the convex wall portions being convex in a direction approaching the groove center of the shoulder main groove; and
the concave wall portions being provided at axially inner end portions thereof with recess portions locally recessed axially inwardly and having openings at a ground contacting surface of the tread portion.

2. The tire according to claim 1, wherein, the recess portions have widths in the tire circumferential direction gradually decreasing axially inwardly at least at the ground contacting surface.

3. The tire according to claim 1, wherein, the recess portions extend from the ground contacting surface to a groove bottom surface of the shoulder main groove.

4. The tire according to claim 1, wherein,
the shoulder main groove comprises an outer groove wall on an axially outer side,
the outer groove wall has an angle with respect to a tread normal line of the outer groove wall in the cross section of the shoulder main groove periodically increasing and decreasing in the tire circumferential direction so that the outer groove wall comprises convex wall portions and concave wall portions arranged alternately in the tire circumferential direction,
the convex wall portions of the outer groove wall face the concave wall portions of the inner groove wall and are convex in a direction approaching the groove center of the shoulder main groove, and
the concave wall portions of the outer groove wall face the convex wall portions of the inner groove wall and are concave in a direction away from the groove center of the shoulder main groove.

5. The tire according to claim 4, wherein,
each of the inner groove wall and the outer groove wall extends outwardly in a tire radial direction from the groove bottom surface and obliquely in a direction away from the groove center, and
in any cross section of the shoulder main groove, the angle of the outer groove wall is larger than the angle of the inner groove wall.

6. The tire according to claim 1, wherein,
the tread portion is provided with a middle land region adjacent to the shoulder main groove on the inner side in the tire axial direction, and
the middle land region is provided with middle lateral grooves connected with the recess portions and extending across the middle land region.

7. The tire according to claim 6, wherein, the middle lateral grooves comprise main body portions having openings on a side of the ground contacting surface of the middle land region, and sipe portions extending radially inwardly from bottom portions of the main body portions with smaller widths than those of the main body portions.

8. The tire according to claim 7, wherein, sipe walls of the sipe portions on one side in the tire circumferential direction are smoothly connected with groove walls of the main body portions on the one side in the tire circumferential direction such that respective single linear walls are formed on the one side in the tire circumferential direction.

9. The tire according to claim 8, wherein,
the middle lateral grooves comprise first middle lateral grooves and second middle lateral grooves arranged alternately in the tire circumferential direction,
in each of the first middle lateral grooves, the single linear wall is located on a first circumferential direction, and
in each of the second middle lateral grooves, the single linear wall is located on a second circumferential direction.

10. The tire according to claim 1, wherein, each of the recess portions comprises a pair of first groove walls connected with the inner groove wall and a second groove wall extending between the pair of the first groove walls in the tire circumferential direction.

11. The tire according to claim 1, wherein,
the shoulder main groove comprises an outer groove wall,
in the cross section of the shoulder main groove, each of the inner groove wall and the outer groove wall comprises a main body portion extending radially outwardly from the groove bottom surface and obliquely in a direction away from the groove center of the shoulder main groove, and an outer portion connected with the main body portion on a radially outer side thereof and extending obliquely at an angle with respect to a tread normal line of the outer portion larger than an angle of the main body portion with respect to a tread normal line of the main body portion.

12. The tire according to claim 11, wherein, a maximum depth of the outer portion is 0.30 to 0.50 times a maximum depth of the shoulder main groove.

13. The tire according to claim 11, wherein, the angle of each of the main body portions with respect to the respective tread normal line in the cross section of the shoulder main groove periodically increases and decreases in the tire circumferential direction so that each of the main body portions comprises the concave wall portions and the convex wall portions arranged alternately in the tire circumferential direction.

14. The tire according to claim 13, wherein, each of the convex wall portions of the inner groove wall faces corresponding one of the concave wall portions of the outer groove wall.

15. The tire according to claim 13, wherein, the angle of the main body portion of the outer groove wall with respect to the tread normal line of the main body portion of the outer groove wall is larger than the angle of the main body portion of the inner groove wall with respect to the tread normal line of the main body portion of the inner groove wall.

16. The tire according to claim 15, wherein, difference between the angle of the main body portion of the inner groove wall and the angle of the main body portion of the outer groove wall with respect to the respective tread normal line is in a range of from 2 to 13 degrees.

* * * * *